(12) United States Patent
Todhunter et al.

(10) Patent No.: US 7,672,831 B2
(45) Date of Patent: Mar. 2, 2010

(54) SYSTEM AND METHOD FOR CROSS-LANGUAGE KNOWLEDGE SEARCHING

(75) Inventors: James Todhunter, Framingham, MA (US); Igor Sovpel, Minsk (BY); Heorhi Zhyhalko, Minsk (BY)

(73) Assignee: Invention Machine Corporation, Boston, MA (US)

( * ) Notice: Subject to any disclaimer, the term of this patent is extended or adjusted under 35 U.S.C. 154(b) by 601 days.

(21) Appl. No.: 11/258,248

(22) Filed: Oct. 24, 2005

(65) Prior Publication Data

US 2007/0094006 A1    Apr. 26, 2007

(51) Int. Cl.
*G06F 17/20* (2006.01)
*G06F 17/28* (2006.01)
*G06F 17/30* (2006.01)

(52) U.S. Cl. .................. 704/4; 704/2; 704/7; 704/8; 704/9; 707/3; 707/4

(58) Field of Classification Search .................. 704/4, 704/7–9, 10, 2; 707/4, 3
See application file for complete search history.

(56) References Cited

U.S. PATENT DOCUMENTS

| | | | |
|---|---|---|---|
| 5,404,295 | A | 4/1995 | Katz et al. |
| 5,418,889 | A | 5/1995 | Ito |
| 5,694,592 | A | 12/1997 | Driscoll |
| 5,724,571 | A | 3/1998 | Woods |
| 5,794,050 | A | 8/1998 | Dahlgren et al. |
| 5,933,822 | A | 8/1999 | Braden-Harder et al. |
| 5,966,686 | A | 10/1999 | Heidorn et al. |
| 6,006,221 | A * | 12/1999 | Liddy et al. .................. 707/5 |
| 6,056,428 | A | 5/2000 | Devoino et al. |
| 6,167,370 | A | 12/2000 | Tsourikov et al. |
| 6,185,592 | B1 | 2/2001 | Boguraev et al. |
| 6,202,043 | B1 | 3/2001 | Devoino et al. |
| 6,212,494 | B1 | 4/2001 | Boguraev |
| 6,263,335 | B1 | 7/2001 | Paik et al. |
| 6,381,598 | B1 | 4/2002 | Williamowski et al. |
| 6,754,654 | B1 | 6/2004 | Kim et al. |
| 6,823,325 | B1 | 11/2004 | Davies et al. |

(Continued)

FOREIGN PATENT DOCUMENTS

WO        97/08604        3/1997

OTHER PUBLICATIONS

Fattah et al. "English/Arabic bilingual dictionary construction using parallel texts from the intenet archive", Circuits and Systems, IEEE, Dec. 2003.*

(Continued)

*Primary Examiner*—Richemond Dorvil
*Assistant Examiner*—Jialong He
(74) *Attorney, Agent, or Firm*—Mills & Onello, LLP; David M. Mello

(57) ABSTRACT

A system and method for cross-language knowledge searching. The system has a Semantic Analyzer, a natural language user request/document search pattern/semantic index Generator, a user request search pattern Translator and a Knowledge Base Searcher. The system also provides automatic semantic analysis and semantic indexing of natural language user requests/documents on knowledge recognition and cross-language relevant to user request knowledge extraction/searching. System functionality is ensured by Linguistic Knowledge Base as well as by a number of unique bilingual dictionaries of concepts/objects and actions.

28 Claims, 3 Drawing Sheets

U.S. PATENT DOCUMENTS

| | | | |
|---|---|---|---|
| 6,871,199 | B1 | 3/2005 | Binnig et al. |
| 7,058,626 | B1* | 6/2006 | Pan et al. ............... 707/4 |
| 7,146,358 | B1* | 12/2006 | Gravano et al. ............. 707/4 |
| 7,260,570 | B2* | 8/2007 | Brown et al. ............. 707/4 |
| 2001/0021934 | A1* | 9/2001 | Yokoi ............... 707/500 |
| 2002/0010574 | A1 | 1/2002 | Tsourikov et al. |
| 2002/0116176 | A1 | 8/2002 | Tsourikov et al. |
| 2002/0184206 | A1* | 12/2002 | Evans ............... 707/4 |
| 2003/0130837 | A1 | 7/2003 | Batchilo et al. |
| 2003/0200079 | A1* | 10/2003 | Sakai ............... 704/8 |
| 2004/0006560 | A1* | 1/2004 | Chan et al. ............. 707/3 |
| 2004/0261021 | A1 | 12/2004 | Mittal et al. |
| 2005/0114282 | A1 | 5/2005 | Todhunter |
| 2005/0131874 | A1 | 6/2005 | Verbitsky |
| 2006/0041424 | A1 | 2/2006 | Todhunter et al. |

OTHER PUBLICATIONS

Fujii et al. "Japanese/English cross-language information retrieval: exploration of query translation and transliteration", Computers and the Humanities, pp. 389-420, 2001.*

Pipkola et al. "Dictionary-based cross-language information retrieval: problems, methods, and research findings", Information retrieval, pp. 209-230, 2001.*

Ballesteros et al. "Phrasal translation and query expansion techniques for cross-language information retrieval", SIGIR 1997.*

Khoo, Christopher S.G., et al., "Automatic Extraction of Cause-Effect Information from Newspaper Text Without Knowledge-Based Inferencing", XP-002427013, Literary and Linguistic Computing, vol. 13, No. 4, 1998,. pp. 177-186.

Feng, L., et al., "Beyond information searching and browsing: acquiring knowledge from digital libraries", Information Processing and Management, 41 (2005), pp. 97-120.

Volk, Martin, et al., "Semantic Annotation for Concept-Based Cross-Language Medical Information Retrieval", International Journal of Medical Informatics 67 (2002), pp. 97-112.

Radev, D.R., et al., "Ranking Suspected Answers to Natural Language Question Using Predictive Annotation", Proceedings of the 6th Applied Natural Language Processing Conference, Apr. 29-May 4, 2000, pp. 150-157.

Srihari, R., et al., "A Question Answering System Supported by Information Extraction", Proceedings of the 6th Applied Natural Language Processing Conference, Apr. 29-May 4, 2000, pp. 166-172.

Cardie, C., et al., "Examining the Role of Statistical and Linguistic Knowledge Sources in a General-Knowledge Question-Answering System", Proceedings of the 6th Applied Natural Language Processing Conference, Apr. 29-May 4, 2000, pp. 180-187.

Abney, S., et al., "Answer Extraction", Proceedings of the 6th Applied Natural Language Processing Conference, Apr. 29-May 4, 2000, pp. 296-301.

* cited by examiner

Action dictionary

| English | French |
|---|---|
| Reduce | abaisser, minorer, réduire, amenuiser, s'abaisser, s'amoindrir, diminuer |
| Indicate | indiquer, représenter, signaler, déterminer, designer, montrer |

FIG. 2A

Concept dictionary

| English | French |
|---|---|
| data processing | informatique |
| pneumatic tyre | chambre à air |
| cholesterol | cholestérol |
| cable car | funiculaire |

FIG. 2B

SYSTEM AND METHOD FOR CROSS-LANGUAGE KNOWLEDGE SEARCHING

RELATED APPLICATIONS

The present application, while not claiming priority to, may be related to the following U.S. patent applications: U.S. patent application Ser. No. 09/815,260, filed Mar. 22, 2002 (U.S. Patent Appl. Pub. No. 20020010574); U.S. patent application Ser. No. 09/991,079, filed Nov. 16, 2001 (US Patent Appl. Pub. No. 20020116176); and U.S. patent application Ser. No. 10/208,941, filed Jul. 31, 2002 (U.S. Patent Appl. Pub. No. 20030130837). All of these applications are incorporated herein by reference in their entirety.

BACKGROUND

1. Field

This application relates to systems and methods of automatic knowledge recognition in text documents and natural language interface for accessing the user Knowledge Base aimed at cross-language knowledge/document extraction, relevant to the user request.

2. Description of Related Art

The following U.S. Patent and U.S. Patent Publication documents provide descriptions of art related to the present application: U.S. Pat. No. 5,404,295, issued April 1995 to Katz et al. (hereinafter Katz et al.); U.S. Pat. No. 5,694,592, issued December 1997 to Driscoll (hereinafter Driscoll); U.S. Pat. No. 5,724,571, issued March 1998 to Woods (hereinafter Woods); U.S. Pat. No. 5,794,050, issued August 1998 to Dahlgren et al. (hereinafter Dahlgren et al.); U.S. Pat. No. 5,933,822, issued August 1999 to Braden-Harder et al. (hereinafter Braden-Harder et al.); U.S. Pat. No. 5,966,686, issued October 1999 to Heidorn et al. (hereinafter Heidorn et al.); U.S. Pat. No. 6,381,598, issued April 2002 to Williamowski et al. (hereinafter Williamowski et al.); and U.S. Publication No. 20040261021, published December 2004 by Mittal et al. (hereinafter Mittal et al.).

The following non-patent documents also provide descriptions of art related to the present application:

Radev D. R. et al. "Ranking Suspected Answers to Natural Language Question Using Predictive Annotation", Proceedings of the 6th Applied Natural Language Processing Conference, pp. 150-157, Apr. 29-May 4, 2000 (hereinafter Radev et al.);

Srihari R. et al. "A Question Answering System Supported by Information Extraction", Proceedings of the 6th Applied Natural Language Processing Conference, pp. 166-172, Apr. 29-May 4, 2000 (hereinafter Srihari et al.);

Cardie C. et al. "Examining the Role of Statistical and Linguistic Knowledge Sources in a General-Knowledge Question-Answering System", Proceedings of the 6th Applied Natural Language Processing Conference, pp. 180-187, Apr. 29-May 4, 2000 (hereinafter Cardie et al.); and Abney S. et al. "Answer Extraction", Proceedings of the 6th Applied Natural Language Processing Conference, pp. 296-301, Apr. 29-May 4, 2000 (hereinafter Abnely et al.).

In information-providing systems, information or knowledge may be retrieved or extracted in accordance with user requests or queries. It is preferable that the user requests are formulated in the natural language (NL). Given such queries, the system tries to present them in a formal way by means of special analysis. Such attempts are referred to as NL understanding systems. The first forms of presentation were sequences of keywords, Boolean expressions composed of keywords, particular lexical units, etc.

It is not difficult to see that further investigations in the art were required. New computer-based technologies have been developed. Such techniques have, for example, dealt with preprocessing available information and analyzing a user request with linguistic means.

For preprocessing, corpus texts may be subjected to stages of tagging, parsing and semantic analysis. The stage of tagging, or morphological analysis, comprises word and punctuation symbol extraction from the text followed by attaching the dictionary information to each word, namely all possible forms, senses and grammatical roles the word can have in the sentence. During the parsing stage, syntactic structure of the sentence is presented in the form of syntax parse tree where each leaf node represents one word or punctuation mark of the sentence. Intermediate-level leaves stand for different syntactic formations—e. g., a noun phrase, a verb phrase, a prepositional phrase, etc.—consisting in their turn of other syntactic formations or ordinary words and punctuation marks; the composition of these nodes is reflected by linking them from below to one or more existing nodes. A single root node of a complete syntax parse tree represents entire sentence. The semantic analysis stage assumes a deeper level of understanding the text, a level analogous to that achieved by a human reader. This last stage derives various semantic roles words and syntactic formations at play in the text, such as deep subject, deep object, clause, hypernym, means, etc.

User requests may be subjected to a similar three stage analysis as well. Systems exist which are developed specifically to work with input strings in the form of full sentence questions. These systems tag, parse, and analyze semantic structure of a user question.

A machine's understanding of the semantic structure of both the corpus texts and a user request helps in furnishing an adequate response to input question. That is, this understanding will allow the provision of knowledge embodied in the corpus texts that best fulfills the user request.

The use of part-of-speech (POS) tagging, parsing, and semantic analysis allows the construction of a more correct formal representation of a user query, although some systems also use a dialog with the user. Systems that use tagging, parsing and semantic analysis are known in the art. For example, Katz et al. translate user requests (but not all of them) into a structured form. Dahlgren et al. use a NL understanding module (including naïve semantic lexicon, noun and verbs phrase recognition), that receives a NL input and generates a first order logic (FOL) output. Both Braden-Harder et al. and Heidorn et al. translate a user request into a logical form graph (LFG), that is, a set of logical form triples. The Braden-Harder and Heidorn method significantly improves a statistical-based search engine, but it is designed only for the queries in the form of a single sentence or a sentence fragment. The LFG determines semantic relations between important words in a phrase (deep subject, deep object, etc.), but, in fact, it means grammatical subject, object, etc. Besides, query separation into triples destroys its integral semantic representation. The LFG element, to which the question is asked, is not registered. As a result, the system searches for relevant documents, but not exact answers to the user question.

A drawback of these natural language processing (NLP) systems is that it usually becomes increasingly difficult to add new semantic rules to the system. Adding of a new rule generally involves new procedural logic that may conflict with that already programmed in the semantic subsystem.

The size and complexity of a LGF or FOL makes the use of them quite difficult and even inefficient for solving many tasks.

Another approach to the development of a NL interface consists not in performing a thorough linguistic analysis of the user query, but in implementing a certain algorithm for the search of separate words that form the query in a document with a subsequent calculation of a relevance level. For example, Driscoll and Woods describe the use of a technique called "relaxation ranking" to find specific passages, where the highest number of query elements was found together, preferably in the same form and order. Radev et al. and Shirai et al. developed a similar approach by combining Question Answering (QA) and NLP techniques. Radev et al. and Shirai et al. don't use full-scale NLP, but some elements of questions and text documents are indexed by means of semantic categories, for example, Q/A Tokens as described in Radev et al. Cardie et al. combine methods of standard ad-hoc information retrieval (IR), query-dependent text summarization and shallow semantic sentence analysis. However, the Cardie system focuses on the extraction of noun phrases and uses a dialog with the user. Abney et al. makes use of both IR and NLP technologies; this makes the Abney system more robust in comparison with a pure NLP method, while affording greater precision than a pure IR system would have. But the Abney authors themselves admit that comparatively low quality of the system requires improvement of the NLP component, development of a larger question corpus, etc.

Thus, regardless of the fact that there exist many different approaches to building systems of analysis/understanding of the text, none of them provides an ideal NL user interface. Moreover, failure to perform NL analysis of the user query, or shallow analysis, may bring inadequate results. Woods states that "linguistic knowledge can improve information retrieval"—so that this thesis should be considered relevant in the solving the problem. Asking questions, a user wants to receive relevant information, i.e., knowledge. Main elements of this knowledge are: objects/concepts, (for example: invention, cool water); facts (fire heats water); and cause-effect relations between the facts formulated in the form of rules that reflect the regularities of the outer world/subject domain (for example: if F1 (fire heats water to 100 deg.) then F2 (water boils)).

Based on the recognition of this linguistic knowledge in text documents, US Patent Appl. Pub. No. 20020010574, titled "Natural Language Processing and Query Driven Information Retrieval"; US Patent Appl. Pub. No. 20020116176, titled "Semantic Answering System and Method"; and US Patent Appl. Pub. No. 20030130837, titled "Computer-based Summarization of Natural Language Documents" describe another approach to the analysis of NL user requests and text documents, based on the complete and correct POS-tagging, parsing and semantic analysis of NL. The approach provides analysis of any user NL request and/or text document, and search of knowledge, concerning the objects, facts and regularities of the outer world/subject domain, and also any of the elements (properties, relations) of this knowledge.

New possibilities of the efficient solutions to search problems and knowledge engineering caused further growth in the usage of text resources. However, knowledge necessary to a user can be contained in documents in different languages, while the user prefers to communicate with the system in his or her native language. This then results in the problem of cross-language knowledge search and extraction. Existing systems including those mentioned above are aimed at information search, not knowledge search. Therefore, those which address the "cross-language problem" typically solve it by simply translating keywords from a user query using bilingual dictionaries. For example, Williamowski et al. use an expression formed by keywords (elementary words) and Boolean operators as a user query. These words are then translated using domain specific dictionaries and stemmed, resulting in a set of combinations of stemmed and translated elementary words. Using this set of user query search expressions, the Williamowski et al. system performs a conventional keyword search in documents in corresponding natural languages, verifying the correct linguistic structure of the search keywords in the retrieved documents. Mittal et al. translate terms obtained from a user query written in a first format into a second format using a probabilistic dictionary; search a database for information relevant to the translated query and returns to the user search results written in the second format. Unlike the Williamowski et al method, Mittal et al. suggest a method for building the probabilistic dictionary using Google™ anchor-based corpora. Such kinds of corpora typically have poor semantic structures in sentences, and may not be used for precise semantic comparison, therefore resulting in essentially a keyword search.

Hence, given the necessity of deep linguistic (including semantic) analysis of user query and text documents, embodiments of the present invention address the "cross-language problem" by considering the results of such analysis, even at the dictionary building stage.

SUMMARY

The present invention provides the ability for a computer to automatically recognize knowledge in natural language documents and to interpret NL user request during cross-language knowledge search and extraction. User requests may concern separate objects/concepts, facts of knowledge domain and relations between them. This ability is provided, first of all by the Semantic Analyzer, which, by semantically analyzing NL user request and NL documents, facilitates further the building of their search patterns/semantic indexes in the form of eSAO, i.e. seven-field semantic units Subject—Action—Object—Adjective—Preposition—Indirect Object—Adverbial and constraints.

A user request semantic index enters a translator module, which performs its translation to any other NL from the number of NL present in the documents which are stored in a database, while all constituents of the semantic index, lexical and grammatical characteristics, semantic roles and relations are preserved. The search of relevant knowledge and documents relevant to a user request comes to matching a user request semantic index both in the source and target languages to the corresponding subsets of semantic indexes of a knowledge base.

Linguistic analysis of user request and text documents includes part-of-speech tagging, parsing and semantic analysis, ensured by a linguistic knowledge base, which includes different kinds of dictionaries, classifiers, grammars, statistical data, etc. and recognizing linguistic models for text-to-words splitting, recognizing of subject, object, action, etc. This linguistic knowledge base also includes unique bilingual dictionaries of actions and concepts automatically generated from parallel text corpora and used for translating user request semantic index at the level of cross-language knowledge searching and extraction.

BRIEF DESCRIPTION OF THE DRAWINGS

FIG. 2A illustrates a fragment of a bilingual dictionary of actions.

FIG. 2B illustrates a fragment of a bilingual dictionary of concepts/objects.

DETAILED DESCRIPTION

Figure 1:
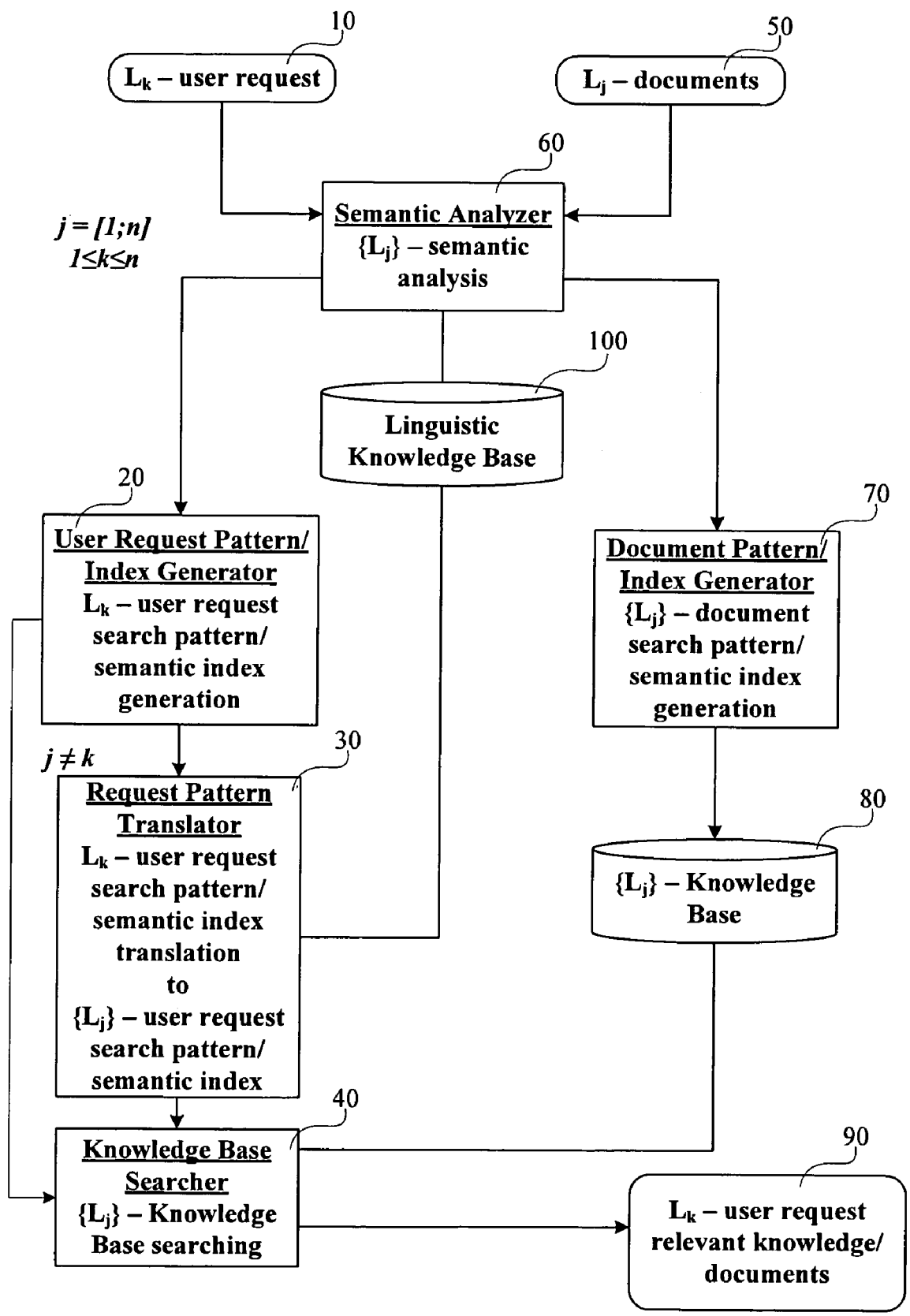
FIG. 1 provides the structural and functional scheme of the system.

The present invention relates to a system and method for semantic analysis of NL documents/user request on knowledge recognition and cross-language knowledge searching/extraction according to NL user request.

Some embodiments of the present invention employ an expanded subject-action-object (SAO) format for formal representation of the content of the user request and documents. The expanded SAOs (or eSAOs) units may include the following seven components:

1. Subject (S), performs an action (A) on an object (O);
2. Action (A), performed by a subject (S) on an object (O);
3. Object (O), acted upon by a subject (S) with an action (A);
4. Adjective (Adj), characterizes subject (S) or action (A) which follows the subject in eSAO with empty object (O) (e.g. "The invention is "efficient"", "The water becomes "hot"");
5. Preposition (Prep), governs Indirect Object (e.g. "The lamp is placed "on" the table", "The device reduces friction "by" ultrasound");
6. Indirect Object (IO), manifested, as a rule, by a noun phrase, which together with a preposition characterizes action, being an adverbial modifier (e.g. "The lamp is placed on the "table"", "The device reduces friction by "ultrasound""); and
7. Adverbial (Adv), characterizes, as a rule, the conditions of the performing action A (e.g. "The process is "slowly" modified", "The driver must not turn wheel "in such a manner"")

Examples of the application of the eSAO format are shown below in Tables 1 and 2:

TABLE 1

| Input Sentence: |  |
| --- | --- |
| A dephasing element guide completely suppresses unwanted modes. | |
| Output: | |
| Subject: | dephasing element guide |
| Action: | suppress |
| Object: | unwanted mode |
| Preposition | — |
| Indirect Object | — |
| Adjective | — |
| Adverbial | completely |

TABLE 2

| Input Sentence: |  |
| --- | --- |
| The maximum value of x is dependent on the ionic radius of the lanthanide element. | |
| Output: | |
| Subject: | maximum value of x |
| Action: | be |
| Object | — |

TABLE 2-continued

| Preposition | on |
| --- | --- |
| Indirect Object | ionic radius of the lanthanide element |
| Adjective | dependent |
| Adverbial | |

A preferred system and method of automatic eSAO recognition in user NL request/text documents, which may include a Preformatter (for preformatting the original user request/text document) and may also include a Linguistic Analyzer (for part-of-speech tagging, parsing and semantic analysis of user request/text document), is described in detail in US Patent Appl. Pub. No. 20020010574, titled "Natural Language Processing and Query Driven Information Retrieval," and US Patent Appl. Pub. No. 20020116176, titled "Semantic Answering System and Method."

For example, if the system receives the input user request "How to reduce the level of cholesterol in blood?" then, at the level of eSAO recognition, it will be transformed to the representation shown in Table 3:

TABLE 3

| Input Sentence: |  |
| --- | --- |
| How to reduce the level of cholesterol in blood? | |
| Output: | |
| Subject: | — |
| Action: | reduce |
| Object | level of cholesterol |
| Preposition | in |
| Indirect Object | blood |
| Adjective | — |
| Adverbial | — |

If the system receives as an input, for example, a sentence from a text document reciting "Atorvastatine reduces total cholesterol level in the blood by inhibiting HMG-CoA reductase activity" then, after the sentence has been processed, the formal representation of the sentence will include three eSAOs shown in Table 4:

TABLE 4

| Input Sentence: |  |
| --- | --- |
| Atorvastatine reduces total cholesterol level in the blood by inhibiting HMG-CoA reductase activity | |
| Output: eSAO$_1$ | |
| Subject: | atorvastatine |
| Action: | inhibit |
| Object | HMG-CoA reductase activity |
| Preposition | — |
| Indirect Object | — |
| Adjective | — |
| Adverbial | — |
| Output: eSAO$_2$ | |
| Subject: | atorvastatine |
| Action: | reduce |
| Object | total cholesterol levels |
| Preposition | in |
| Indirect Object | blood |
| Adjective | — |
| Adverbial | — |

TABLE 4-continued

Output: eSAO₃

| | |
|---|---|
| Subject: | inhibiting HMG-CoA reductase activity |
| Action: | reduce |
| Object: | total cholesterol levels |
| Preposition: | in |
| Indirect Object: | blood |
| Adjective | — |
| Adverbial | — |

A system according to an embodiment of the present invention is depicted in FIG. 1. As shown in FIG. 1, the system includes: Semantic Analyzer 60 (for semantic analysis of user requests and documents, presented in any j from the number n of natural languages); User Request Pattern/Index Generator 20 (for search pattern/semantic index generation of user requests, presented in some k natural language); Document Pattern Index Generator 70 (for search pattern/semantic index generation of text documents entering the system in any j from the number n of natural languages and building the $\{L_j\}$—Knowledge Base 80); Request Pattern Translator 30 (for $L_k$ user request search pattern/semantic index translation in any j from all the number of n natural languages, where j≠k); Knowledge Base Searcher 40 (for $\{L_j\}$—user request search pattern/semantic index relevant knowledge and document searching in $\{L_j\}$—Knowledge Base 80). The functionality of all the modules of the system may be maintained within the Linguistic Knowledge Base 100, which includes various databases, such as dictionaries, classifiers, statistical data etc., and a database for recognizing linguistic models (for text-to-words splitting, recognition of noun and verb phrases, subjects, objects, actions and their attributes, cause-effect recognition, etc.)

Semantic analysis of $L_k$—user requests and $\{L_j\}$—documents, $L_k$—user request and $\{L_j\}$—document semantic index generation, and $\{L_j\}$—Knowledge Base searching are described in detail in U.S. Patent Appl. Pub. No. 20020010574, titled Natural Language Processing and Query Driven Information Retrieval, and U.S. Patent Appl. Pub. No. 20020116176, titled Semantic Answering System and Method. Embodiments of the present invention preferably use the methods, systems, and techniques described in these referenced documents for semantic analysis, semantic index generation, and knowledge base searching.

It should be pointed out that the semantic indexes/search patterns of $L_k$—user request and text documents present a number of eSAOs as well as constraints that are extracted from the user requests/text documents with the help of $\{L_j\}$—Semantic Analyzer 60. The recognition of all eSAO elements is implemented by means of corresponding Recognizing Linguistic Models that are the part of the Linguistic Knowledge Base 100. These models describe rules that use part-of-speech tags, lexemes and syntactic categories which are then used to extract from the parsed text eSAOs with finite actions, non-finite actions, verbal nouns. One example of an Action extraction rule is:

<HVZ><BEN><VBN> => (<A>=<VBN>)

This rule means that "if an input sentence contains a sequence of words w1, w2, w3 which at the step of part-of-speech tagging obtained HVZ, BEN, VBN tags respectively, then the word with VBN tag in this sequence is an Action". For example, the phrase "has been produced" would be parts-of-speech tagged as "has_HVZ been_BEN produced_VBN" and the rule would show that "produce" is an Action. i.e., (A=produce). Furthermore, the voice of the action (active or passive voice) is taken into consideration in the rules for extraction of Subject and Object. Constraints are informative lexical units of the user requests/text document which are not parts of eSAO. At the same time, all the elements (lexical units) of the semantic index go together with the corresponding part-of-speech tags.

Thus, for example, for the abovementioned user request "How to reduce the level of cholesterol in blood?" the semantic index will correspond to the combination field shown in Table 5:

TABLE 5

Input Sentence:

How to reduce the level of cholesterol in blood?

Output:

| | |
|---|---|
| Subject: | — |
| Action: | Reduce_VB |
| Object | level_NN/attr=parameter/ of_IN cholesterol_NN/main |
| Preposition | in_IN |
| Indirect Object | blood_NN |
| Adjective | — |
| Adverbial | — |

Note that each NL will have a separate but similar in function Semantic Analyzer 60. Therefore, an embodiment of the present invention may have multiple Semantic Analyzers 60, where each Semantic Analyzer is used for a separate NL. Note also that the parts of speech are shown, for example, by the "VB, NN, IN" tags in Table 5. See U.S. Patent Appl. Pub. No. 20020010574 and U.S. Patent Appl. Pub. No. 20020116176 for additional description of the POS tags.

The user request 10 may be about: separate objects/concepts (for example, their definitions or parameters); separate facts (for example, way or manner of fulfillment of certain action over a certain object, time and place of the fulfillment of the certain fact); certain relations between facts (for example, the cause of a certain fact); and/or other items.

The Request Pattern/Index Generator 20 provides a $L_k$—user request search pattern/semantic index to the Request Pattern Translator 30 that translates the semantic search pattern corresponding to the query written in source language $L_k$ into a semantic search pattern corresponding to any target language $L_j$, j=1,2, . . . , n, j≠k. Thus, for example, if French is taken as a target language the Request Pattern Translator 30 will build the "French" semantic index shown in Table 6 for the abovementioned user request example:

TABLE 6

Output:

| | |
|---|---|
| Subject: | — |
| Action: | abaisser_VB\|minorer_VB\|réduire_VB\|amenuiser_VB\|diminuer_VB |
| Object | niveau_NN_main\|taux_NN_main\|degré_NN/attr=parameter/ de_IN cholestérol_NN/main |
| Preposition | dans_IN\|en_IN\|aux_IN\|sur_IN |
| Indirect Object | sang_NN |
| Adjective | — |
| Adverbial | — |

Thus, the Request Pattern Translator 30 according to an embodiment of the present invention does not rely upon the simple translation of the separate words of the user request, but, instead, translates certain combinations of the informative words of the user request, while preserving the POS tags, semantic roles and semantic relations of the user request.

The translated search pattern is then provided to the Knowledge Base Searcher 40, which implements the search of relevant user request knowledge/documents in the subset of semantically indexed text documents contained in the {$L_j$}—Knowledge Base 80, that corresponds to the target language $L_j$ (in the given example to French). The search typically comprises matching the user request semantic index presented in the original source language and selected target languages in the corresponding subsets of semantic indexes of the {$L_j$}—Knowledge Base 80 taking into account synonymic and hierarchical relations for search patterns.

The Request Pattern Translator 30 preferably uses a number of unique bilingual dictionaries including bilingual dictionaries of actions and bilingual dictionaries of concepts/objects. See FIG. 2A for an example of an action dictionary where the source language is English and target language is French. FIG. 2B shows an example of a concept/object bilingual dictionary where, again, the source language is English and the target language is French.

Figure 3:
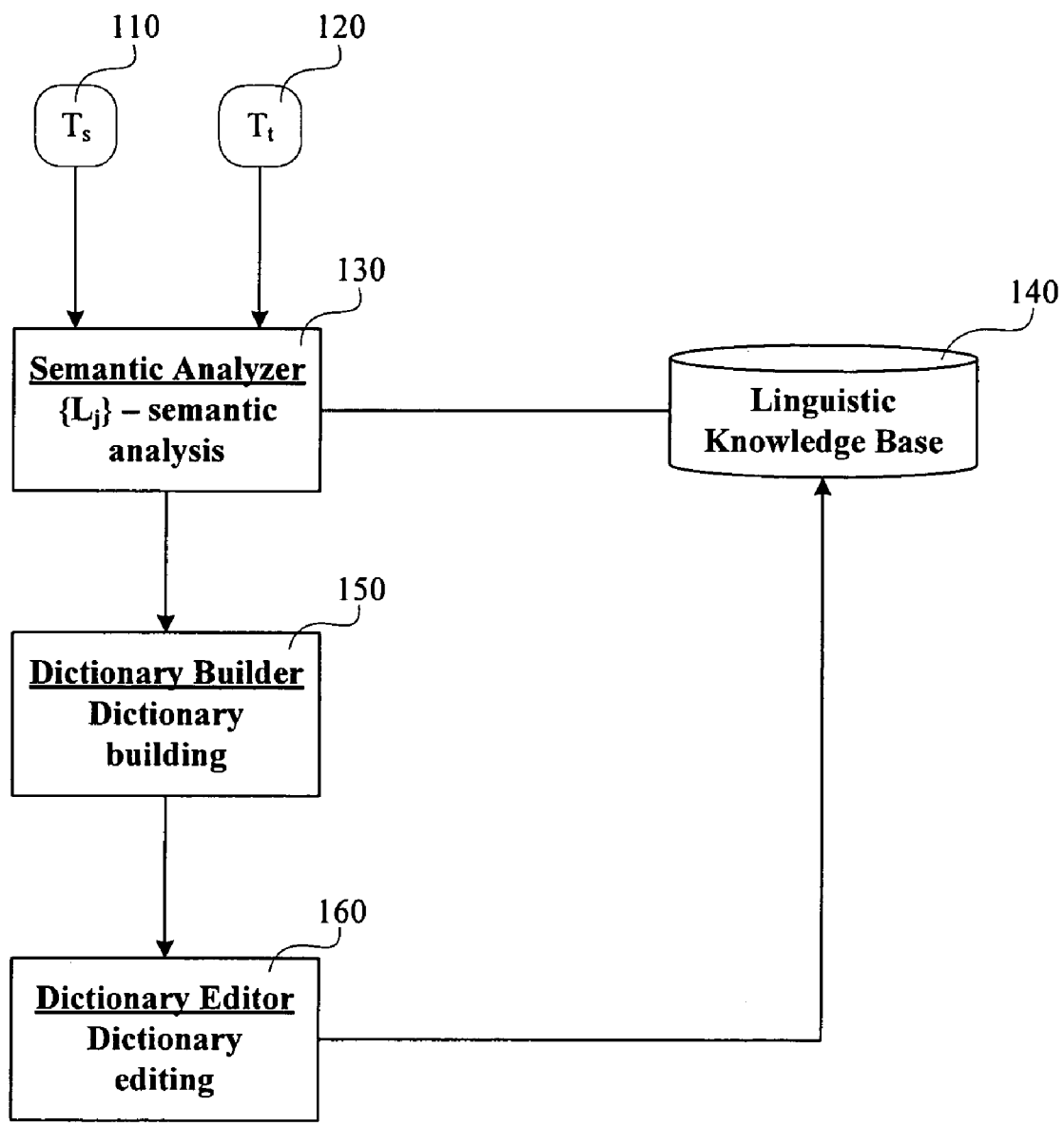
FIG. 3 provides the structural and functional scheme of the Dictionary Builder.

FIG. 3 illustrates the building of such dictionaries according to some embodiments of the present invention. Building of such dictionaries is based on the use of parallel corpora. Two parallel corpora $T_s$ 110 and $T_t$ 120 are first processed with a Semantic Analyzer 130—each corpus 110, 120 processed with a Semantic Analyzer 130 corresponding to the language of each corpus 110, 120. The parallel corpora $T_s$ and $T_t$ preferably comprise documents that represent sentence by sentence translations of each other, where one corpus $T_s$ 110 is in language s and the other corpus $T_t$ 120 is in language t. The Semantic Analyzers 130 (one for language s and one for language t transform each corpus 110, 120 to semantic indexes presented as a number of parallel eSAOs. The Dictionary Builder 150 extracts pairs of parallel subjects and objects from the parallel eSAOs and builds a bilingual dictionary of concepts. Similarly, the Dictionary Builder 150 extracts parallel actions for building bilingual action dictionaries. Since each parallel pair represents the same semantic element, each pair essentially comprises equivalent lexical language units. The dictionary generated by the Dictionary Builder 150 is then further processed by the Dictionary Editor 160 that provides tools for editing (for example, deletion of repeating pairs of lexical units). The edited dictionary is then added to the Linguistic Knowledge Base 140 together with other linguistic resources used by the Semantic Analyzer 130.

The usage of concept and action dictionaries while translating user request search patterns (as shown by the Pattern Translator 30 in FIG. 1) should significantly reduce the ambiguity of multiword concepts in a user request. The ambiguity should be further reduced or eliminated when searching due to the context provided by all of the abovementioned fields of the semantic index. Hence, the system and method according to embodiments of the present invention provide for improved extraction of knowledge from sources in multiple languages and for improved designation and extraction of documents containing relevant knowledge.

The system and method according to embodiments of the present invention may be provided by computer-executable instructions resident on one or more computers, microprocessors, microcontrollers, or other processing devices. The computer-executable instructions for executing the system and method may be resident in memory in the processing devices or may be provided to the processing devices by floppy disks, hard disks, compact disk (CDs), digital versatile disks (DVDs), read only memory (ROM), or any other storage medium.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . ".

What is claimed is:

1. A computer-based method for cross-language knowledge searching, the method implemented by at least one computer processor accessing at least one knowledge base comprising sources in a first language and sources in a second language and a bilingual dictionary stored in at least one storage device, the method comprising:

building the bilingual dictionary using parallel corpora, including:

for each sentence in a first source in the first language, generating a first source semantic index in the first language;

for each sentence in a second source in the second language, generating a second source semantic index in the second language, where the second source is a translation of the first source and each first source semantic index and corresponding second source semantic index form parallel semantic indexes having parallel eSAO component pairs; and recognizing semantic components in an input expression in the first language;

generating a first semantic index in the first language from the semantic components, wherein the first semantic index includes first lexical units, at least one first lexical unit comprising a word with a part of speech (POS) tag;

translating the first semantic index into a second semantic index in the second language using a bilingual dictionary of actions and concepts, including translating the first lexical units into second lexical units in the second language, and translating a first word from the first semantic index into corresponding words in the second language and tagging each of the corresponding words with a POS tag of the first word; and retrieving information relevant to the input expression from a knowledge base, which includes semantically indexed information in the second language, when the first and second semantic indexes match a subset of semantic indexes of the knowledge base associated with the information.

2. The method according to claim 1, wherein the method further comprises:
performing a search of the knowledge base of sources in the first language based on the first semantic index to access the information relevant to the input expression.

3. The method according to claim 2, wherein building the knowledge base comprises:
performing semantic analysis on a plurality of sources in the first and the second language; and
generating semantic indices for the plurality of sources based on the semantic analysis.

4. The method according to claim 1, wherein generating the first semantic index includes performing a semantic analysis identifying expanded subject-action-object (eSAO) units in the input expression.

5. The method according to claim 4, wherein generating the first semantic index comprises identifying one or more eSAO components in each identified eSAO unit and the first semantic index comprises the one or more eSAO components.

6. The method according to claim 5, wherein translating the first semantic index to the second semantic index comprises translating each eSAO component in the first semantic index from the first language into at least one corresponding eSAO component in the second language.

7. The method according to claim 6, wherein translating each eSAO component from the first language comprises accessing one or more bilingual dictionaries of actions and/or concepts, wherein the bilingual dictionaries match an eSAO component in the first language to one or more eSAO components in the second language.

8. The method according to claim 7, wherein the bilingual dictionaries comprise bilingual dictionaries of actions and bilingual dictionaries of concepts/objects.

9. The method according to claim 1, wherein the input expression comprises a user request.

10. The method according to claim 1, further comprising:
translating the first semantic index to a plurality of semantic indices for a plurality of languages different than the first language; and
performing a search of knowledge bases of sources in the plurality of languages based on the plurality of semantic indices to access information relevant to the expression.

11. The method according to claim 1, wherein retrieving information relevant to the input expression comprises providing one or more documents in the first and the second language relevant to the input expression or providing one or more output expressions relevant to the input expression.

12. The method of claim 1, further including:
extracting parallel actions and concepts from parallel semantic indexes and storing the parallel actions and concepts in the bilingual dictionary.

13. The method of claim 12, further comprising:
automatically editing the bilingual dictionary, including deleting repeating pairs of lexical units from the parallel eSAO component pairs; and
storing the edited bilingual dictionary in a linguistic knowledge base.

14. The method according to claim 12, wherein one corpus from one parallel corpora comprises sources comprising sentence-by-sentence translations in the first language of the sources of the other corpus from the same parallel corpora in the second language.

15. A computer-readable medium having computer-executable instructions for performing a method for cross-language knowledge searching when executed by at least one processor, the method comprising:
accessing at least one knowledge base comprising sources in a source language and sources in a target language and a bilingual dictionary stored in at least one storage device;
building the bilingual dictionary using parallel corpora, including:
for each sentence in a first source in the source language, generating a first source semantic index in the source language;
for each sentence in a second source in the target language, generating a second source semantic index in the target language, where the second source is a translation of the first source and each first source semantic index and corresponding second source semantic index form parallel semantic indexes having parallel eSAO component pairs;
recognizing semantic components in a user request received in a source language;
generating a first semantic index in the source language from the semantic components, the first semantic index including first lexical units, at least one lexical unit comprising a word with a part of speech (POS) tag;
translating the first semantic index into a second semantic index in a target language using a bilingual dictionary of actions and concepts, including translating the first lexical units into second lexical units in the target language, and translating a first word from the first semantic index into corresponding words in the target language and tagging each of the corresponding words with a POS tag of the first word; and
retrieving information relevant to the user request from the knowledge base that includes semantically indexed information in the target language, when the first and second semantic indexes match a subset of semantic indexes of the knowledge base associated with the information.

16. A computerized cross-language knowledge search system, comprising:
a bilingual dictionary builder that uses parallel corpora, comprising:
a first semantic analyzer configured to generate, for each sentence in a first document in a first language, a first document semantic index including eSAO components in the first language;
a second semantic analyzer configured to generate, for each sentence in a second document in a second language, a second document semantic index including eSAO components in the second language, where the second document is a translation of the first document and each first document semantic index and corresponding second document semantic index form parallel semantic indexes having parallel eSAO component pairs;
the first semantic analyzer also configured to recognize semantic components in a user request received in the first language,
a request pattern index generator configured to generate a first semantic index in the first language from the semantic components of the user request, the first semantic index including first lexical units, at least one lexical unit comprising a word with a part of speech (POS) tag;
a request pattern translator that accesses a bilingual dictionary of actions and concepts to translate the first semantic index into a second semantic index in the second language, including translating the first lexical units into second lexical units in the second language, and translating a first word from the first semantic index into corresponding words in the second language and tagging each of the corresponding words with a POS tag of the first word; and a knowledge base searcher configured to retrieve information from a knowledge base that includes semantically indexed information in the second language, when the first and second semantic indexes match a subset of semantic indexes of the knowledge base associated with the information.

17. The system according to claim 16, wherein the knowledge base searcher is also configured to retrieve information from one or more knowledge bases of sources in the first language based on the first language expression semantic index.

18. The system according to claim 17, wherein the system further comprises:
one or more source semantic analyzers configured to identify semantic components in the sources in the first and in one or more other languages, wherein each source semantic analyzer corresponds to the first and to one of the one or more other languages; and
one or more source pattern index generators configured to the identified semantic components in the sources into source semantic indices in the first and in one or more of the other languages of the sources, wherein the one or more knowledge bases comprise the source semantic indices.

19. The system according to claim 18, wherein the one or more source semantic analyzers are coupled to a linguistic knowledge base.

20. The system according to claim 16, wherein the semantic components comprise expanded subject-action-object (eSAO) components.

21. The system according to claim 20, further comprising:
a linguistic knowledge base that comprises a plurality of eSAO component pairs, wherein one part of an eSAO component pair comprises one or more eSAO components in one language and the other part of the eSAO component pair comprises one or more eSAO components in another language.

22. The system according to claim 21, wherein the plurality of eSAO component pairs are organized into one or more bilingual dictionaries.

23. The system according to claim 22, wherein the one or more bilingual dictionaries comprise bilingual dictionaries of actions and bilingual dictionaries of concepts/objects.

24. The system according to claim 21, further comprising:
a document pattern translator that locates each eSAO component in the first language expression semantic index in one part of an eSAO component pair and produces the other language expression semantic index based on the other part of the eSAO component pair.

25. The system according to claim 16, wherein the input expression comprises a user request.

26. The system of claim 16, wherein the
dictionary builder is also configured to extract parallel actions and concepts from parallel semantic indexes and store the parallel actions and concepts in the bilingual dictionary.

27. The system of claim 26, further comprising:
a dictionary editor configured to edit the bilingual dictionary, including deleting repeating pairs of lexical units from the parallel eSAO component pairs, and store the edited bilingual dictionary in a linguistic knowledge base.

28. The system according to claim 26, wherein one corpus from the parallel corpora comprises sources comprising sentence-by-sentence translations in the first language of the sources of the other corpus from the same parallel corpora in the second language.

* * * * *